United States Patent

Valvo

[19]

[11] Patent Number: 5,881,332
[45] Date of Patent: Mar. 9, 1999

[54] FILM SUPPLY AND FILM TAKE-UP MAGAZINE

[75] Inventor: David J. Valvo, Rochester, N.Y.

[73] Assignee: Eastman Kodak Company, Rochester, N.Y.

[21] Appl. No.: 872,907

[22] Filed: Jun. 11, 1997

[51] Int. Cl.[6] .................................................. G03B 17/26
[52] U.S. Cl. ........................ 396/511; 396/513; 396/647; 242/347
[58] Field of Search .................. 396/511, 512, 396/513, 516, 647, 518; 242/341, 347

[56] References Cited

U.S. PATENT DOCUMENTS

| | | | |
|---|---|---|---|
| 1,036,385 | 8/1912 | Vale | 396/513 |
| 2,439,112 | 4/1948 | Teague | 396/446 |
| 3,482,681 | 12/1969 | Nerwin et al. | 206/410 |
| 3,548,728 | 12/1970 | Ariyasu et al. | 396/512 |
| 3,805,277 | 4/1974 | Domnick | 396/207 |
| 4,008,483 | 2/1977 | Swift et al. | 396/518 |
| 4,281,913 | 8/1981 | Shono et al. | 396/446 |
| 4,290,680 | 9/1981 | Muramatsu et al. | 396/511 |
| 4,529,149 | 7/1985 | d/Alayer De Costemore d'Arc | 242/347 |
| 4,986,490 | 1/1991 | Tranquilla | 242/338 |
| 5,638,162 | 6/1997 | Stephenson, III et al. | 396/513 |
| 5,715,495 | 2/1998 | Nishimura | 396/513 |

*Primary Examiner*—D. Rutledge
*Attorney, Agent, or Firm*—Roger A. Fields

[57] ABSTRACT

A film magazine comprising a housing having a film egress slot and a film ingress slot, a film supply spool rotatably supported within the housing proximate the film egress slot, and a film take-up spool rotatably supported within the housing proximate the film ingress slot, is characterized in that the housing has a pair of opposite ends that are spaced apart a maximum dimension of the housing, and the film egress and film ingress slots are positioned at the respective ends of the housing in order that a filmstrip connected through the film egress and film ingress slots to the film supply and film take-up spools must longitudinally extend between the film supply and film take-up spools a minimum length that is greater than the maximum dimension of the housing.

5 Claims, 3 Drawing Sheets ically known, the description which follows is
FILM SUPPLY AND FILM TAKE-UP MAGAZINE

FIELD OF THE INVENTION

The invention relates generally to the field of photography, and in particular to film magazines. More specifically, the invention relates to a combined film supply and film take-up magazine.

BACKGROUND OF THE INVENTION

A "film magazine", as the term is widely used, refers to a light-tight container or roll film holder for holding various film lengths. One type of known film magazine that is intended to be attached to a camera, often at the back of the camera, includes a housing having a film egress slot and a film ingress slot, a film supply spool rotatably supported within the housing proximate the film egress slot, and a film take-up spool rotatably supported within the housing proximate the film ingress slot. Film magazines are illustrated in prior art U.S. Pat. Nos. 1,036,385 issued Aug. 20, 1912, No. 3,482,681 issued Dec. 9, 1969, and No. 3,548,728 issued Dec. 22, 1970.

SUMMARY OF THE INVENTION

According to the invention, a film magazine comprising a housing having a film egress slot and a film ingress slot, is characterized in that:

the housing has a pair of opposite ends that are spaced apart a maximum dimension of the housing, and the film egress and film ingress slots are positioned at the respective ends of the housing in order that a filmstrip longitudinally extending through the film egress and film ingress slots into the housing must longitudinally extend a minimum length that is greater than the maximum dimension of the housing.

More specifically, a film magazine comprising a housing having a film egress slot and a film ingress slot, a film supply spool rotatably supported within the housing proximate the film egress slot, and a film take-up spool rotatably supported within the housing proximate the film ingress slot, is characterized in that:

the housing has a pair of opposite ends that are spaced apart a maximum dimension of the housing, and the film egress and film ingress slots are positioned at the respective ends of the housing in order that a filmstrip connected through the film egress and film ingress slots to the film supply and film take-up spools must longitudinally extend between the film supply and film take-up spools a minimum length that is greater than the maximum dimension of the housing.

DETAILED DESCRIPTION OF THE INVENTION

The invention is disclosed as being embodied preferably in a film magazine. Because the features of a film magazine are generally known, the description which follows is directed in particular only to those elements forming part of or cooperating directly with the disclosed embodiment. It is to be understood, however, that other elements may take various forms known to a person of ordinary skill in the art.

Figure 1:
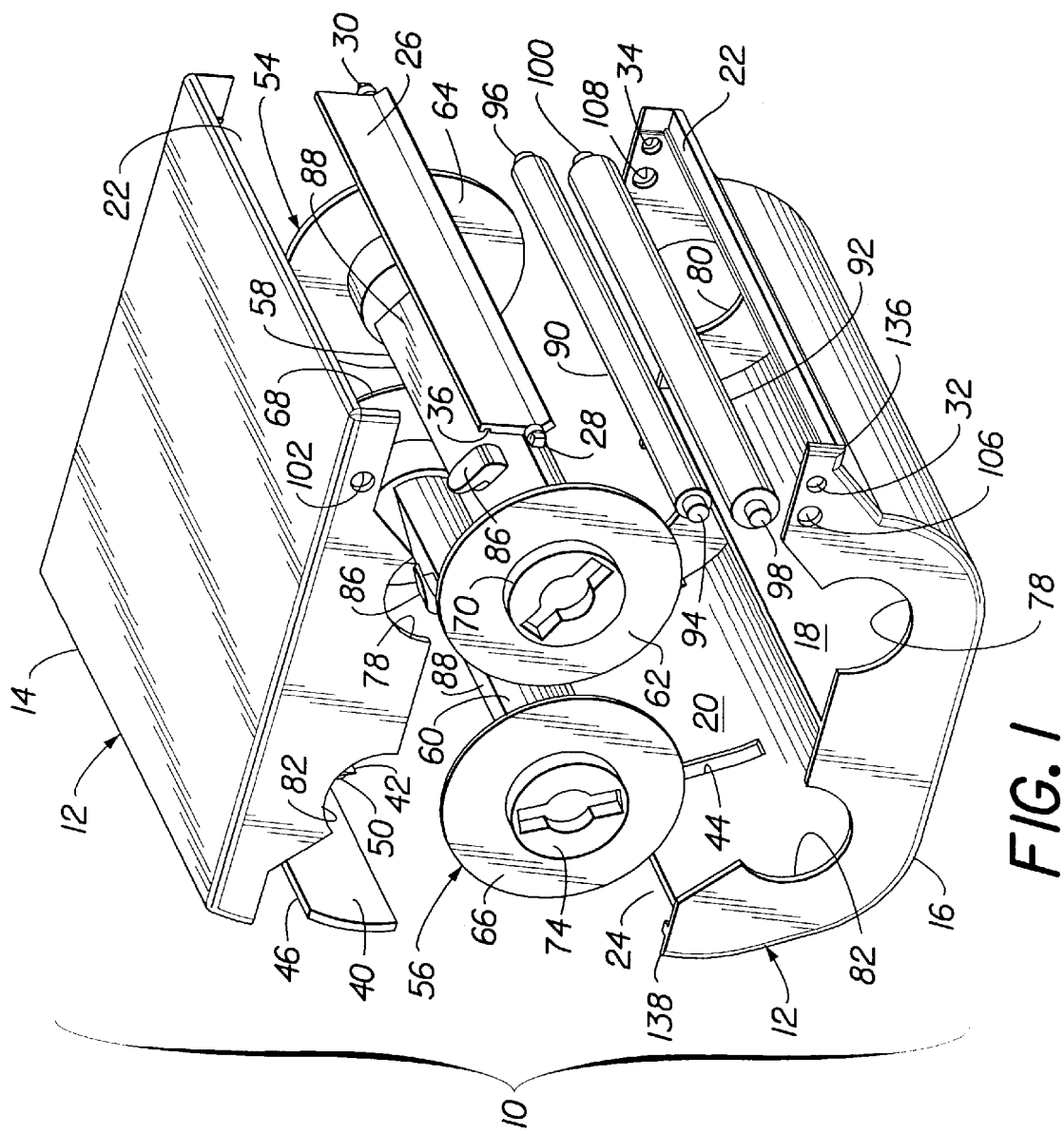
FIG. 1 is an exploded perspective view of a film magazine pursuant to a preferred embodiment of the invention.
Figure 2:
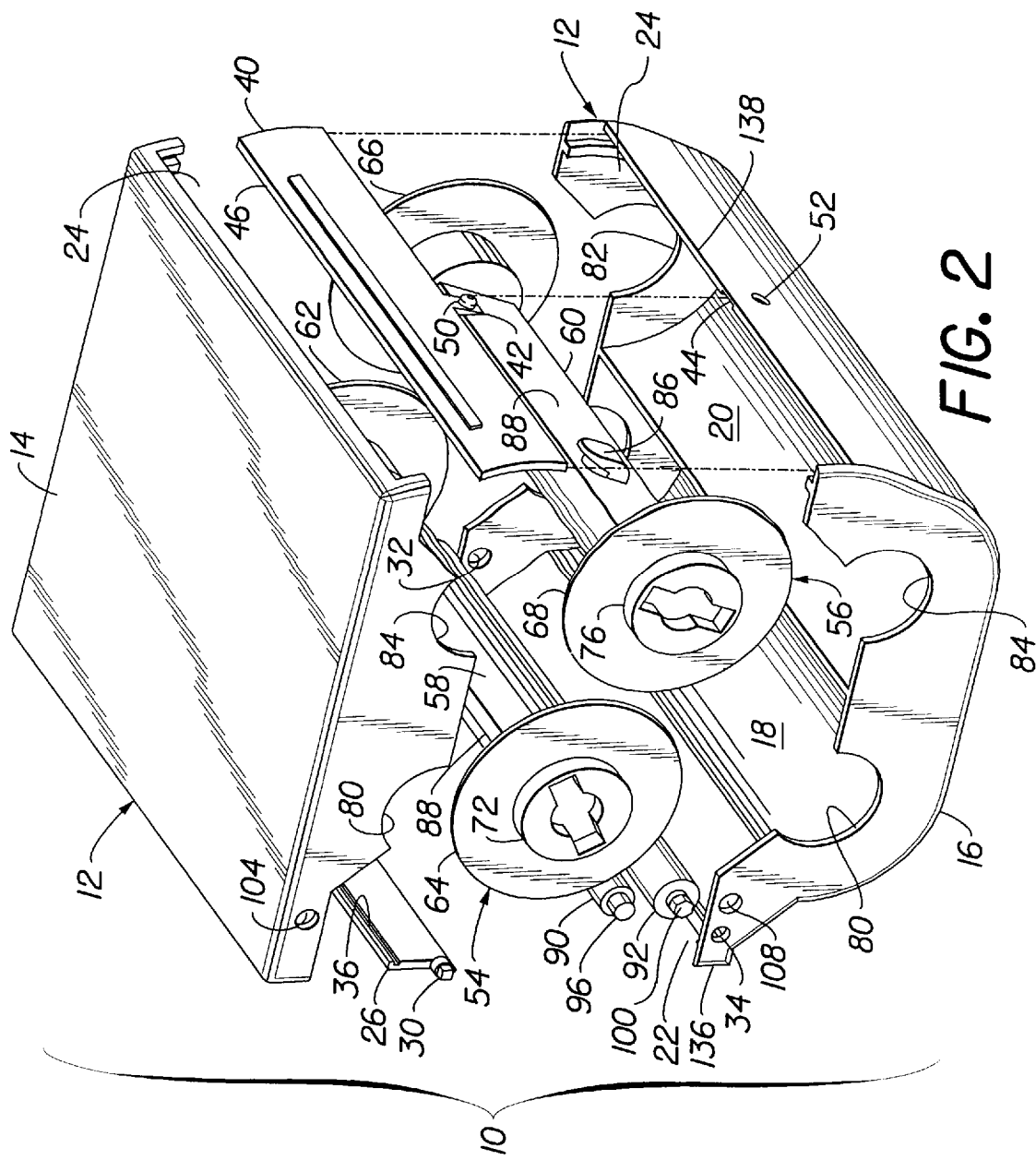
FIG. 2 is a perspective view similar to FIG. 1, but showing the film magazine rotated 180 degrees.

Referring now to the drawings, FIGS. 1 and 2 show a film magazine 10 with a light-tight housing 12 that has a top housing half 14 and a bottom housing half 16. The top and bottom housing halves 14 and 16 are permanently connected together to form side-by film supply and film take-up chambers 18 and 20 and respective film egress and film ingress slots 22 and 24 adjacent the two chambers. The film egress and ingress slots 22 and 24 face in opposite directions, i.e. away from each other.

A pivotable light lock 26 has a pair of coaxial pivot pins 28 and 30 that fit into respective bearing holes 32 and 34 in the bottom housing half 16 to support the light lock for pivotal opening and closing movement at the film egress slot 22. See FIGS. 1 and 2. A groove 36 in the light lock 26 light-tightly mates with an integral rib 38 of the top housing half 14 when the light lock is closed. See FIG. 3.

A translatable light lock 40 is end-supported as shown in FIG. 2 for translational opening and closing movement at the film ingress slot 24, and has a resilient integral tab 42 that fits in a channel 44 in the bottom housing half 16 to help guide the light lock for translational opening and closing movement. See FIGS. 2 and 3. An end portion 46 of the light lock 40 is light-tightly received in a cavity 48 in the upper housing half 14 when the light lock is closed. The resilient tab 42 has a locking protuberance 50 that snaps into a mating hole 52 in the bottom housing half 16 to secure the light lock 40 in place when the light lock is closed, but which can be pushed out of the hole to release the light lock to permit the light lock to be opened.

A pair of identical film supply and film take-up spools 54 and 56 are positioned in the respective chambers 18 and 20. The film supply and take-up spools 54 and 56 have respective spool cores 58 and 60 with pairs of flanges 62, 64 and 66, 68 and pairs of end portions 70, 72 and 74, 76. The pair of end portions 70, 72 are rotatably supported in respective bearing holes 78, 80 in the top and bottom cover halves 14 and 16, and the pair of end portions 74, 76 are rotatably supported in respective bearing holes 82, 84 in the top and bottom cover halves. See FIGS. 1 and 2. The spool cores 58 and 60 each have a known film engageable hook 86 that projects from a flat core surface 88.

A pair of resilient film-thrusting or film-propelling pinch rollers 90 and 92 are rotatably supported at respective roller pins 94, 96 and 98, 100 in pairs of bearing holes 102, 104 and 106, 108 in the top and bottom housing halves 14 and 16. See FIGS. 1 and 2.

Figure 3:
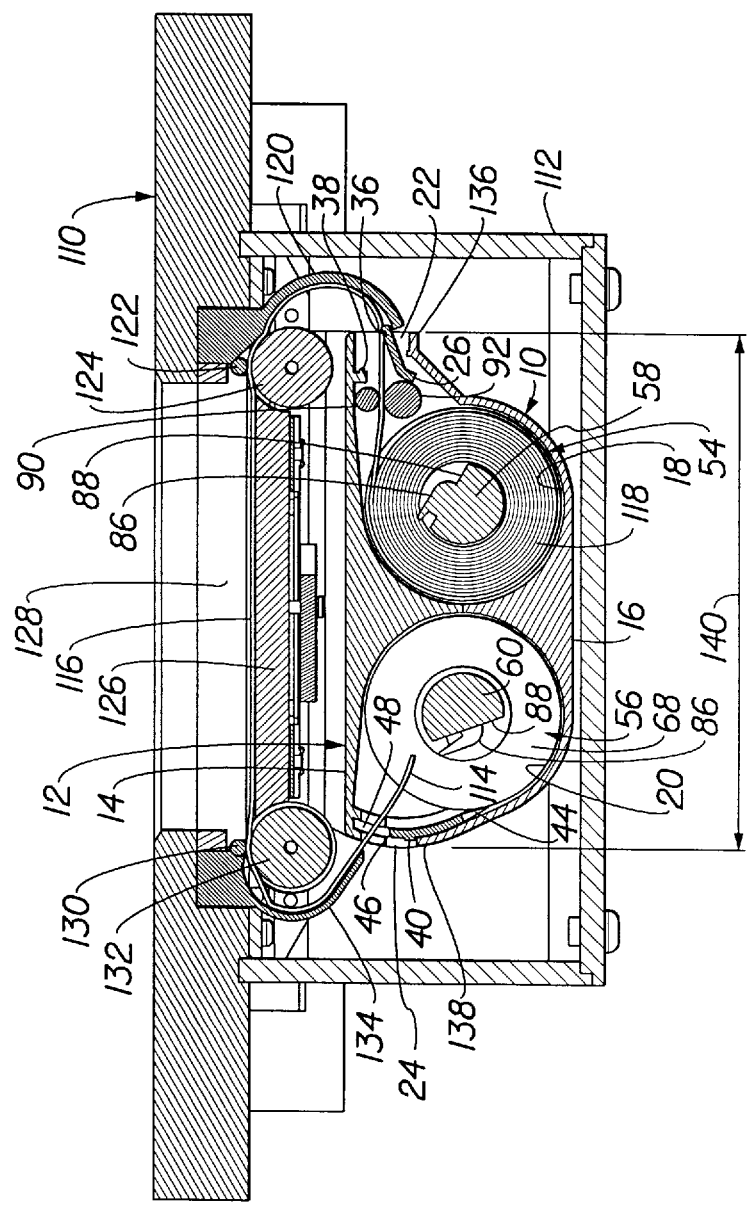
FIG. 3 is an elevation cross-section view of the film magazine being used in a partially shown camera.

A camera 110 to be used with the film magazine 10 is partially shown in FIG. 3. The camera 110 has a rear housing 112 into which the film magazine 10 is top-loaded through an opened door (not shown). Once the door is closed, known opening means (not shown) in the rear housing 112 rotationally engages the pivot pin 28 or 30 of the light lock 26 and pivots the light lock open. Another opening means (not shown) in the rear housing 110 pushes the protuberance 50 out of the hole 52 and translates the light lock 40 open. Then, known drive means (not shown) in the rear housing 110 rotationally engages the roller pins 94 or 96 and 98 or 100 and rotates the pinch rollers 90 and 92. The pinch rollers 90 and 92 are rotated to thrust the leading section 114 of an unexposed filmstrip 116, wound in a roll 118 onto the spool core 58, from the roller nip through the film egress slot 22 and along an arcuate guide shoe 120 to a contiguous first pair of driving and driven rollers 122 and 124. Then another drive means (not shown) in the rear housing 112 rotationally engages the end portion 74 or 76 of the spool core 60 and rotates the film take-up spool 56. The contiguous first pair of driving and driven rollers 122 and 124 advance the leading section 114 of the filmstrip 116 over a film support platen 126 at a backframe (exposure) opening 128 to a contiguous second pair of driving and driven rollers 130 and 132. In turn, the contiguous second pair of driving and driven rollers 130 and 132 advance the leading section 114 of the filmstrip 116 along an arcuate guide shoe 134 through the film ingress slot 24 and into engagement with the film engageable hook 86 of the film take-up spool 56. This completes the film initialization or film threading operation in the camera 110. Thereafter successive sections of the filmstrip 116 can be wound off the film supply spool 54, exposed at the backframe opening 128 when a shutter (not shown) is momentarily opened to take a picture, and wound onto the film take-up spool 56.

As can be seen in FIG. 3, the housing 12 of the film magazine 10 has a pair of opposite or extreme ends 136 and 138 that are spaced apart a maximum dimension 138 of the housing. The film egress and film ingress slots 22 and 24 are positioned at the respective ends 134 and 136 in order that the filmstrip 116, when longitudinally extending through the film egress and film ingress slots into the housing 12, must longitudinally extend a minimum length that is greater than the maximum dimension 140 of the housing.

The invention has been described with reference to a preferred embodiment. However, it will be appreciated that variations and modifications can be effected by a person of ordinary skill in the art without departing from the scope of the invention.

PARTS LIST 10. film magazine
12. housing
14. top housing half
16. bottom housing half
18. film supply chamber
20. film take-up chamber
22. film egress slot
24. film ingress slot
26. pivotable light lock
28. pivot pin
30. pivot pin
32. bearing hole
34. bearing hole
36. groove
38. rib
40. translatable light lock
42. tab
44. channel
46. end portion
48. cavity
50. locking protuberance
52. mating hole
54. film supply spool
56. film take-up spool
58. spool core
60. spool core
62. flange
64. flange
66. flange
68. flange
70. end portion
72. end portion
74. end portion
76. end portion
78. bearing hole
80. bearing hole
82. bearing hole
84. bearing hole
86. film engageable hook
88. flat core surface
90. film-thrusting roller
92. film-thrusting roller
94. roller pin
96. roller pin
98. roller pin
100. roller pin
102. bearing hole
104. bearing hole
106. bearing hole
108. bearing hole
110. camera
112. rear housing
114. leading section
116. filmstrip
118. roll
120. arcuate guide shoe
122. driving roller
124. driven roller
126. film support platen
128. backframe opening
130. driving roller
132. driven roller
134. arcuate guide shoe
136. opposite end
138. opposite end
140. maximum dimension

What is claimed is:

1. A film magazine comprising a housing having a film egress slot and a film ingress slot, is characterized in that:

said housing has a pair of opposite ends that are spaced apart a maximum dimension of the housing, and said film egress and film ingress slots are positioned at said respective ends in order that a filmstrip longitudinally extending through said film egress and film ingress slots into said housing must longitudinally extend a minimum length that is greater than the maximum dimension of the housing; and respective light locks are supported adjacent said film egress and film ingress slots for individual movement to cover and uncover the film egress and film ingress slots.

2. A film magazine as recited in claim 1, wherein a film thrusting device is located in said housing inwardly of said film egress opening to propel the leading section of a filmstrip in the housing through the film egress opening.

3. A film magazine comprising a housing having a film egress slot and a film ingress slot, a film supply spool rotatably supported within said housing proximate said film egress slot, and a film take-up spool rotatably supported within said housing proximate said film ingress slot, is characterized in that:

said housing has a pair of opposite ends that are spaced apart a maximum dimension of the housing, and said film egress and film ingress slots are positioned at said respective ends in order that a filmstrip connected through said film egress and film ingress slots to said film supply and film take-up spools must longitudinally extend between the film supply and film take-up spools a minimum length that is greater than the maximum dimension of said housing; and a film thrusting device is located between said film supply spool and said film egress opening to propel the leading section of a filmstrip connected to the film supply spool through the film egress opening.

4. A film magazine as recited in claim 3, wherein said film egress and film ingress slots are positioned facing in opposite directions at the respective ends of said housing.

5. A film magazine as recited in claim 3, wherein respective light locks are supported adjacent said film egress and film ingress slots for individual movement to cover and uncover the film egress and film ingress slots.

* * * * *